Sept. 20, 1932.  E. E. METCALF  1,877,931
HARVESTER
Filed Nov. 11, 1929  4 Sheets-Sheet 1

INVENTOR
Edgar E. Metcalf
BY Brown, Jackson, Boettcher & Dienner
ATTYS

WITNESS
A. D. McLeay

Sept. 20, 1932.   E. E. METCALF   1,877,931
HARVESTER
Filed Nov. 11, 1929    4 Sheets-Sheet 2

INVENTOR
Edgar E. Metcalf
BY Brown, Jackson, Boettcher & Drenner
ATTYS

WITNESS
A. D. McLeay

Patented Sept. 20, 1932

1,877,931

UNITED STATES PATENT OFFICE

EDGAR E. METCALF, OF MOVILLE, IOWA, ASSIGNOR TO DEERE & COMPANY, OF MOLINE, ILLINOIS, A CORPORATION OF ILLINOIS

HARVESTER

Application filed November 11, 1929. Serial No. 406,192.

This invention relates to harvesters, and more particularly to a harvesting machine in the nature of an attachment adapted to be applied to a tractor.

In my copending application for a Harvester, Serial No. 372,906, filed June 22, 1929, I have disclosed a harvester which in its general construction is similar to the harvester of the instant application.

The present invention has to do more particularly with certain improvements over the structure illustrated in the above mentioned application, specifically, the butt conveyor mechanism and its relation to the stalk conveyor.

My invention also has to do with the binding and tying mechanism, as well as the connecting means between the binder or harvester and the tractor.

One of the main objects of my invention is to provide a harvester comprising a stalk conveyor and a butt conveyor together with means between them, all so constructed and related that the stalks as they are cut are urged away from the sickle toward the stalk conveyor and are transferred to the binder in an upright position. Another object is to provide an improved form of butt conveyor mechanism and one wherein the finger members cooperate with the binding and tying mechanism so as to aid in the collecting and the packing of the cut stalks. Another object of my invention is to provide an improved conveyor mechanism capable of efficiently handling very short grain. A still further object of my invention is to provide a novel form of connecting means between the binder implement and the tractor and one wherein the implement may have vertical movement with respect to the tractor without influencing any of the adjustments of the implement itself. A further object of my invention is to provide a connecting means between an implement and a tractor and one which is capable of being quickly detached from the tractor.

Other objects and advantages of my invention will be apparent to those skilled in the art after a consideration of the following detailed descriptions taken in conjunction with the drawings, in which.

Figures 1, 2, 11:
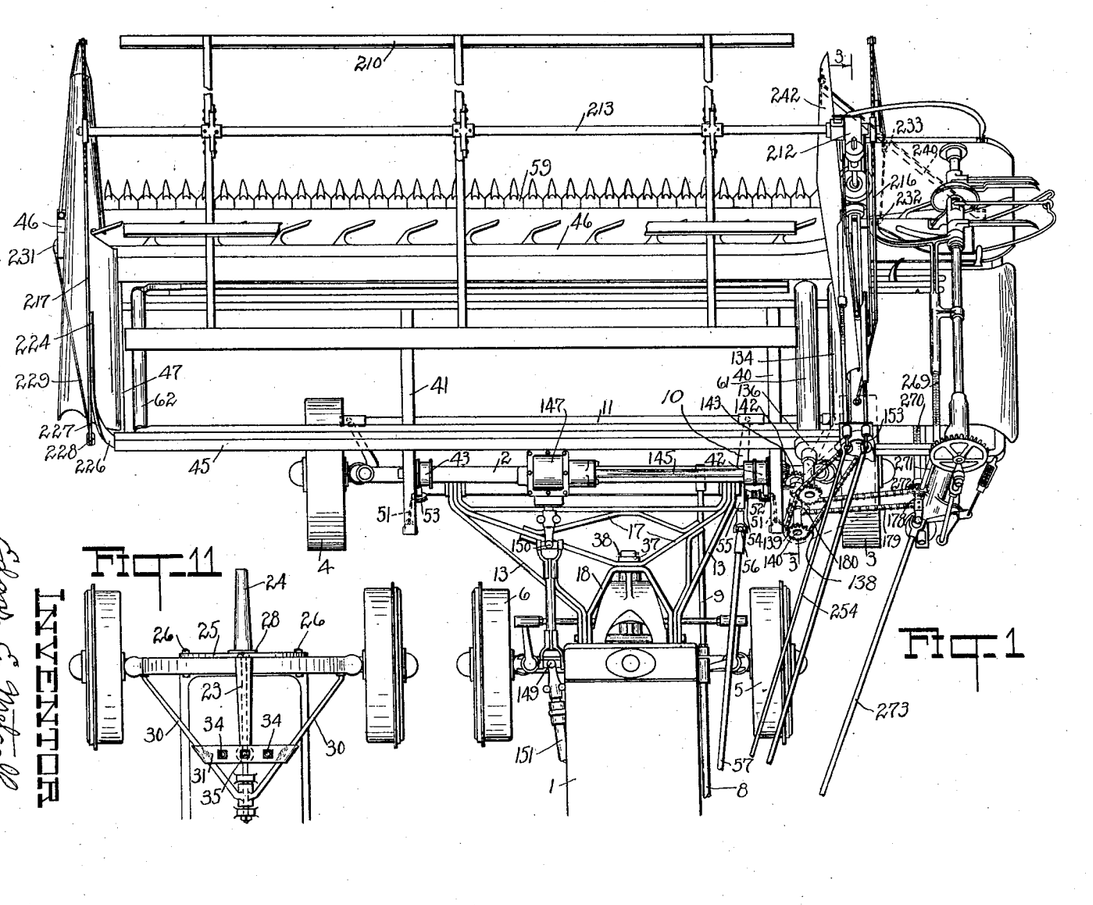
Figure 1 is a plan view of a harvester attached to the tractor, only the front end of the tractor being illustrated.
Figure 2 is a side elevation of the harvester attached to the tractor.
Figure 11 is a bottom view of the tractor showing the special mounting of and the manner of its attachment to the tractor.
Figure 2:
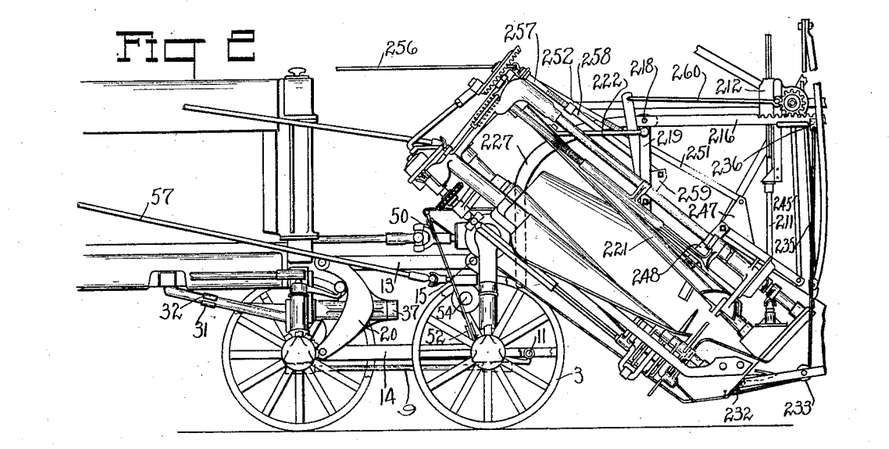

In Figure 1 I have illustrated a harvester in accordance with my invention as applied to a tractor 1 of the usual type. The harvester or binder is mounted upon a truss or frame member 2 which extends transversely and in front of the tractor 1 and comprises an upper and a lower member connected together by a plurality of diagonal braces, somewhat similar to the corresponding frame member shown in my copending application, Serial No. 119,608, filed June 30, 1926. A pair of wheels 3 and 4 are journaled on the outer ends of the frame member 2, the wheels 3 and 4 being so mounted that they are steered simultaneously and differentially with the front steering wheels 5 and 6 of the tractor.

The steering arm 8 of the tractor is extended forwardly, as at 9, and is connected with a bell crank 10 (Figure 1) which, in turn, controls the position of the drag link 11 whereby the wheels 3 and 4 are steered, as is clear from Figure 1.

The draft connection between the front end of the tractor and the transverse frame member 2 of the harvester or binder comprises a pair of links 13 and a second pair of links 14 placed below and of substantially the same length as the pair of links 13. These pairs of links 13 and 14 diverge forwardly and are connected by suitable pivot means 15 to the upper and lower members, respectively, of the transverse frame 2. The links of each pair may be rigidly connected together by means of suitable bracing members 17 and 18, whereby each pair of links form a rigid draft transmitting framework.

The rearward ends of the pairs of links 13 and 14 are pivoted to a draft member in the form of a casting 20. The casting member 20 is journaled upon the front end of a tractor by means which I shall presently describe. A supporting arm 23 is secured to the tractor and extends forwardly therefrom to form a bearing or axle 24 which is of substantial length and which receives the draft member 20 rotatable thereon.

As is shown in Figure 11, the supporting arm 23 is secured to the front of the tractor by means of a plate 25 having an aperture therein to receive the arm 23, the plate 25 being secured to the front face of the front axle of the tractor by means of bolts 26. A shoulder 28 of the arm 23 bears against the front face of the plate 25. The supporting arm 23 extends underneath the tractor and at its end is rigidly connected to the radius rods 30 by means of two plates 31 and 32. The ends of the plates 31 and 32 are clamped to the radius rods by means of bolts 34, and the arm 23 is clamped between the plates 31 and 32 by means of a bolt 35. The draft member 20 is securely held in position on the bearing 24 by means of a collar 37 fastened on the end of a bearing 24 by a bolt 38.

It will thus be seen that by virtue of the pairs of links 13 and 14 the harvester is capable of up and down movement, relative to the tractor, but which is, at the same time, properly held in its vertical position. It is also seen that by virtue of the journaled connection at 24 the harvester may tilt laterally with respect to the tractor while still being maintained in its proper vertical position, and either side of the harvester may rise or fall independently of the front wheels of a tractor. This connection, therefore, provides a full universal connection between the harvester and the tractor. From Figure 2 it will be noted that the extension 9 and the bell crank 10 controlling the position of the drag link 11 lie substantially in the plane of the lower pair of links 14. By virtue of this construction movement of the frame member 2 relative to the tractor will have substantially no affect on the steering position of the dirigible wheels 3 and 4.

Figures 6, 7, 8:
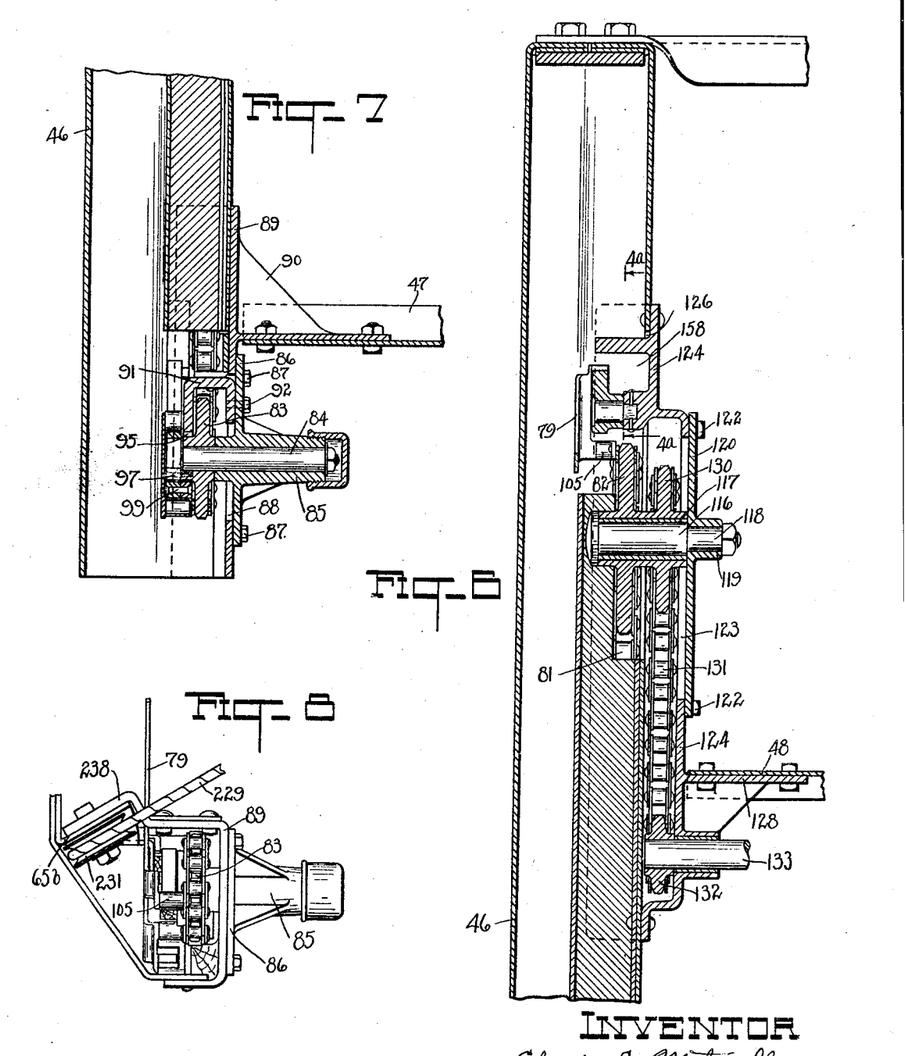
Figure 6 is a cross sectional view taken along the line 6—6 of Figure 4.
Figure 7 is a cross sectional view along the line 7—7 of Figure 5.
Figure 8 is an end view of the return end of the butt conveyor.

The harvester mechanism is mounted on the truss or frame member 2 by means of two downwardly and forwardly extended supporting members 40 and 41 which are pivoted near their upper ends in bearings 42 and 43 carried at the upper or top side of the frame member 2. These supporting members 40 and 41 support a framework comprising an upper transverse channel member 45 and a lower transverse butt conveyor chain housing 46. The channel member 45 and the housing 46 are secured together at their ends by means of two downwardly and forwardly extending channel irons or members 47 and 48 (Figures 1, 6 and 7).

The angular position of this forwardly and downwardly inclined framework is controlled by cables 51 which are fastened to the rear ends of the supporting members 40 and 41. These cables 51 are trained around rollers 52 and 53, respectively, and are connected to a windlass or hoist 54. The windlass 54 is controlled by a worm and gear housed in the housing 55, the worm being connected by a universal joint 56 to a rod 57 which extends therefrom back to the operator's seat on the tractor. Referring to Figure 2 it will be seen that rotation of the rod 57 is operative to actuate the windlass 54 to raise or lower the forward part of the harvester.

The cutting and conveying mechanism of the harvester includes the usual sickle 59 and the usual canvas slatted conveyor mounted on the framework and adapted to operate around rollers 61 and 62 rotatably mounted thereon.

Figure 3:
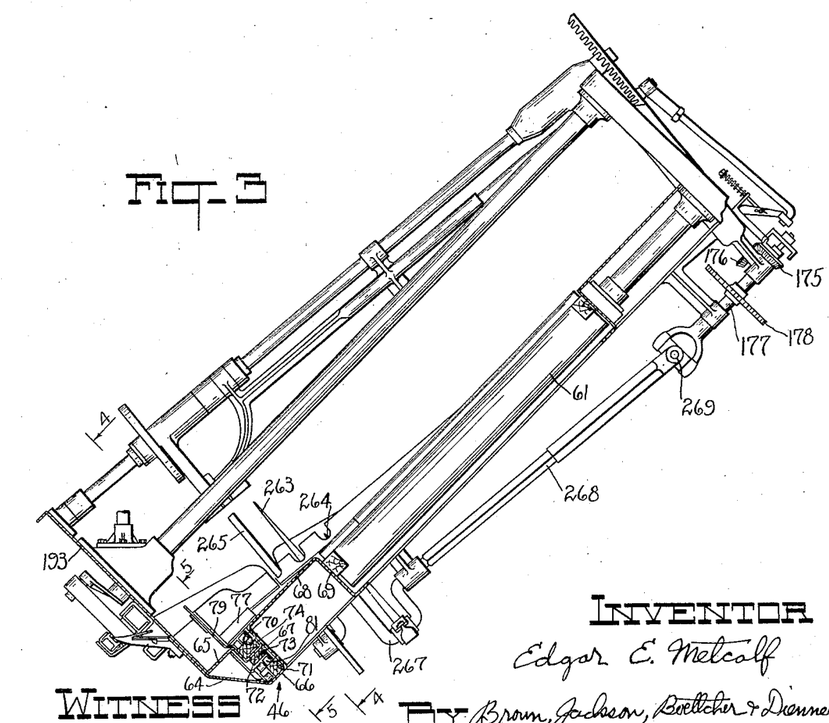
Figure 3 is a cross sectional view taken approximately along the line 3—3 of Figure 1, certain parts being omitted for the purpose of clarity.

The butt conveyor chain housing 46 is best shown in Figure 3 and is seen to comprise two pieces of sheet metal 64 and 65. The piece or plate 64 forms the bottom of the conveyor housing and is bent upwardly at 66 to form the rear side. The sheet metal plate 65 forms the bottom of the trough or butt shelf along which the butts are conveyed. The piece or plate of sheet metal 64 is bent upwardly and forwardly, as at 67, from the rear side 66 and thence is bent upwardly and rearwardly to form a portion 68, at the top of which portion 68 the plate is bent rearwardly and downwardly at 69. Between the downwardly extending portion 69 and the channel member 45 the conveyor canvas (not shown) is positioned to operate over the two rollers 61 and 62, 61 being the driving roller.

Rearwardly and upwardly from the trough or butt shelf the sheet metal plate 65 is bent downwardly then rearwardly and then upwardly to meet the piece 64 at the portion 67.

The bent portions of the plate 65 above the butt shelf thus form a pocket in which a strip of wood 70 is laid to form an upper track along which the butt conveyor chain rides. In the bottom of the plate 64 another strip of wood 71 is positioned to form a track for the lower or return side of the conveyor chain. A third strip of wood 72 is provided in the conveyor housing 46 and is positioned on the under side of the pocket in which the piece of wood 70 is laid. The strip 72 is provided with a small rabbet 73 in its lower rear corner while the strip of wood 70 is provided with a similar rabbet 74 in its upper rear corner. These rabbets form a shoulder against which retaining lugs 75 provided on the butt conveyor chain ride to hold the chain in position. See Figure 4. Above the upper run of the chain, and enclosing the chain and fixed to the top of the section 68, is a metal strip 77. The section 68 is in a plane slightly in advance of the plane of the upwardly inclined bottom of the trough or butt shelf so that a small opening is left between the lower edge of the strip 77 and the bottom of the trough or butt shelf through which the tines 78 of the butt conveyor finger members 79 project.

Figures 4, 5, 9, 10:
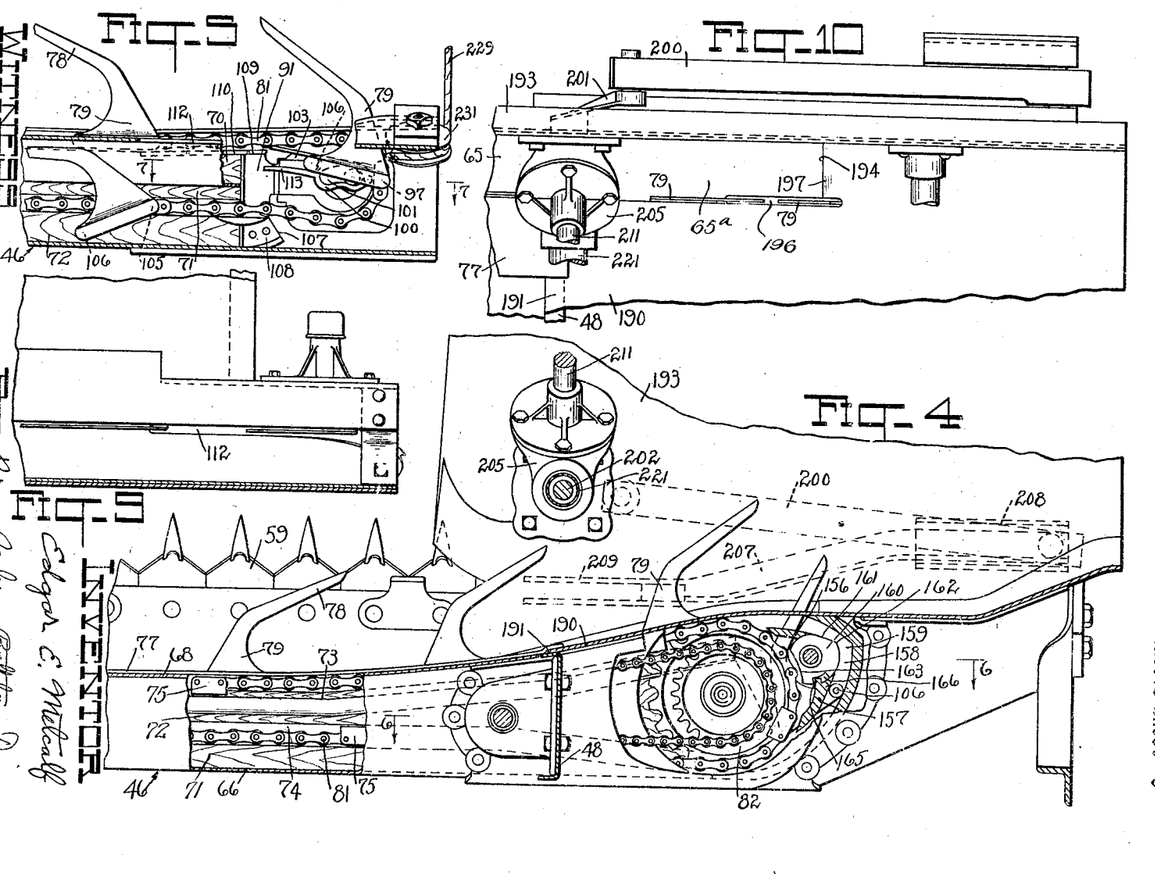
Figure 4 is a cross sectional view of the binder table end taken approximately along the line 4—4 of Figure 3 with one part taken along the line 4a—4a of Figure 6, and with other parts broken away to show the delivery end mechanism of the butt conveyor.
Figure 5 is a cross sectional view of the return end of the butt conveyor taken along the line 5—5 of Figure 3.
Figure 9 is a top view of the return end of the butt conveyor.
Figure 10 is a top view of the lower portion of the binder table and the delivery end of the butt conveyor.

The conveyor chain, referred to above, is indicated by the reference numeral 81 and from Figure 4 is seen to consist of a series of links pivoted together to form an endless flexible element to which is pivoted at spaced intervals the conveyor finger members 79, referred to above. The chain 81 is trained over a sprocket wheel 82 at the delivery end of the conveyor housing and over a sprocket wheel 83 at the other end of the housing, as shown in Figures 4, 5, 7 and 8. The sprocket 83 is keyed to a shaft 84 which is journaled in a bearing 85. The bearing 85 is provided with a flange 86 which is bolted by means of bolts 87 over an opening 88 in a casting 89 which partially encircles and is welded to the extreme end of the conveyor housing 46. The casting member 89 is provided with a rearwardly projecting flange 90 to which the lower end of the channel member 47 is bolted or otherwise secured.

A bracket 91 is secured to the inner face of the flange 86 by means of cap screws 92. The bracket 91 is extended around and in front of the sprocket wheel 83 and is provided with an opening 95 through which the hub of the sprocket wheel 83 projects. A small roller 97 is mounted eccentrically on the hub of the sprocket wheel 83.

Pivotally mounted, as at 99, is a cam member 100 having an arcuate recess 101 formed therein and embracing the roller 97. Opposite its pivotal mounting the cam member 100 is provided with a bifurcated end having a slot 103 therein.

The butt conveyor finger members 79 are pivoted to the chain 81 by means of spacing elements 105 which thus position the finger members in a plane spaced from the plane of the conveyor chain: See Figures 6 and 8. The finger members 79 are pivoted to the chain 81 at their rearward portions, that is, rearward with respect to the direction of their motion when in operative and stalk conveying position. At their forward portions the members 79 are provided with guiding elements 106 in the form of rollers mounted thereon. The bracket member 91 is extended downwardly to the bottom of which a small casting 107 is riveted. This casting has an arcuate slot 108 therein and is shaped to guide the rollers 106 and to lift the same in a position to enter the slot 103 of the cam member 100 when the latter is in its lowermost position. Secured to the top of the bracket 91 is a member 109 riveted thereto, and the member 109 is provided with a horizontal portion 110, see Figure 5, which forms the commencement of the upper track provided by the strip of wood 70.

As the upper run of the chain 81 moves from right to left, as viewed in Figure 5, it will be seen that the sprocket wheel 83 will be rotated causing the oscillation of the cam member 100 between its upper and lower positions. When the cam member 100 is in its lower position the slot 103 is opposite the arcuate slot 108 so that as the finger members in the casing or housing 46 progress from left to right with the lower run of the chain 81 the guiding means or elements 106 will be caused to enter the slot 103. Further movement of the conveyor chain and the rotation of the sprocket member 83 causes the oscillation of the cam member 100 from its lower position to its upper position and thus serves to project the finger member through the slot 112 formed in the top portion of the sheet metal plate 65. Further movement of the conveyor chain 81 causes the finger member 79 to be moved from right to left to engage and convey the butts of the cut stalks, the guiding element or roller 106 moving out of the slot 103 and onto the horizontal portion 110 of the member 109 and thence along the strip of wood 70. The strips of wood 70, 71 and 72 end just short of the member 109. The purpose of the arcuate recess 101 is to allow the cam member 100 to remain substantially stationary during the times that the roller 106 is entering or leaving the slot 103.

That is, in the travel of the finger member 79 from within the housing 46 to its operating position the spacing member 105 starts around the bottom of the sprocket 83 while the cam member 100 is substantially in the position shown in Figure 5. When the roller 106 enters the slot 108 the cam member 100 starts downward and the lower prong 113 passes down between the spacing member 105 and the roller 106, whereupon the roller 106 enters the slot in the cam member 100.

As soon as the roller 106 is in the slot in the cam member, the cam member starts upward and continues until the prong 113 is moved substantially flush with the horizontal portion 110. Then it pauses until the roller 106 has been moved out of the slot 103 and onto the upper track provided by the strip of wood 70.

At the delivery end of the conveyor chain housing 46 the conveyor chain 81 passes around a larger sprocket 82 which is journaled on a stub shaft 116 on a bushing or bearing 117. The stub shaft 116 is provided with a turned-down portion 118 which is bolted to and received in an apertured boss 119 formed on a plate 120. The plate 120 is bolted, as at 122, over an opening 123 in a casting 124. The plate 120 has been removed in Figure 4. The casting 124 is riveted or welded to the rear of the housing 46 over an opening 126 formed therein and into which the sprocket wheel 82 projects.

The casting 124 is provided with a rearwardly projecting flange 128 to which the channel member 48 is bolted, as shown in Figure 6.

The sprocket 130 drives, and is preferably formed integral with, the sprocket wheel 82. The sprocket 130 is driven by a chain 131 trained thereover and over another sprocket 132 which is keyed on the lower end of the shaft 133 upon which the roller 134 is supported: See Figure 1. The shaft 133 is driven through a spur gear connection situated within a housing 136 (Figure 1) from the shaft of the roller 61. This roller 61 is driven through a sprocket which is connected by a chain 138 with a sprocket 139 on the stub shaft 140. The stub shaft 140 is driven through a set of bevel gears 142 and 143, the gear 143 being mounted on the main drive shaft 145 which in turn is driven through a set of driving gears housed in a housing 147. The gears in the housing 147 are driven through a pair of universal joints 149 and 150 from a power take-off shaft 151. The power take-off shaft 151 is driven from the motor of the tractor preferably, but it may be driven from any convenient source of power. The driving end of the main shaft 145 is journaled in a bearing in the pivoting hub of the member 40, the axis of the shaft 145 and the pivoting axis of the members 40 and 41 coinciding. The sprocket chain 138 is extended upwardly and is trained over a sprocket 153 which is connected to drive the sickle 59 as will be described later.

On the inner side of the casting 124 secured at the delivery end of the housing 46, as has been described above, two forwardly projecting ridges 156 and 157 are provided which form a recess or channel 158 to guide the rollers of the finger members 79 as they are moved around the sprocket 82 and are drawn into the housing 46 at the delivery end. The forwardly projecting ridges 156 and 157 are shaped to give the channel 158 an arcuate curvature, which curvature is provided with a sudden break at the point 159. Adjacent this point the ridges 156 and 157 are interrupted to form a space in which a cam 160 is pivoted. The cam 160 is generally circular in shape with a flattened portion at 161, a pointed projection 162, and a concave portion 163 substantially opposite the pointed portion 162. On the lower side of the cam 160 a notch 165 is cut which cooperates with a lug 166 projecting from the ridge 157 into the recess or notch 165 to thereby limit the movement of the cam 160.

When the cam 160 is in its normal position, namely, the position shown in Figure 4, the channel or recess 158 is partially closed. In traveling around the sprocket 82 the roller 106 at the forward end of a finger member 75 is led into the upper portion of the channel or recess 158 and bears against the flattened portion 161 so that as the chain 81 continues to move the finger members 79 the cam 160 is rotated in a clockwise direction, as in Figure 4, to permit the roller 106 to come to a position in the region of the point of sudden brake 159, it being noted that the cam 160 is slightly in advance of the said portion 159.

The roller 106 pauses momentarily here while the rear end or portion of the finger member 75 is traveling past the concave portion 163 of the cam 160. As the chain 81 continues to move the spacing member 105 at the rear end of the finger member 79 contacts with the concave portion 163 and is thus operative to force the cam down to the position shown in Figure 4 which again partially closes the channel or recess 158 to prevent retrograde movement of the roller 106. As the rear end of the finger member is then pulled along, the roller 106 acts as a sort of temporary axis and the tine of the finger member is withdrawn from the stalks, the roller 106 subsequently following down the lower portion of the channel 158. It will be observed that as the tine of the finger member is drawn downwardly its angle is such that it continues to press the stalks in the direction of delivery, to the right as in Figure 4. If no cam 160 were provided, the roller 106 on the front end of the finger member might be forced back along the upper portion of the channel or recess 158 due to the pressure of the stalks against the tine of the finger member 79. Since the cam 160 partially closes the end of the upper portion of the channel or recess 158 the roller of the finger member is forced to follow down the lower portion of the said channel.

In the preferred embodiment illustrated in the drawings, the cam 160 is oscillated first by the roller 106 bearing against the flattened portion 161, then by the spacer member 105 at the rear of the finger member bearing against the concave portion 162.

The cam 160 might be positively driven through suitable cam connections on the face of the sprocket 82 or by any other gear or cam connections found to be desirable, if the need of such a refinement is found to exist.

The forwardly projecting ridges 156 and 157 are so shaped as to cause the tine of the finger member to be pulled down out of the grain substantially along the axis of the tine, and thus with the least amount of resistance. In this way the finger members continue to press the stalks in the direction of delivery, that is, the pressure exerted by the finger members against the stalks at the beginning of the withdrawal movement is maintained throughout the extent of that movement.

The binding and tying mechanism is somewhat similar to standard design in the majority of its elements. The mechanism is driven through a set of bevel gears 175 and 176, Figure 3, the gear 175 being mounted on a shaft 177 driven by a sprocket 178 which, in turn, is driven by a chain 179 trained over the sprocket 178 and over a sprocket 180 rotated by the said shaft 140, see Figure 1.

The lower stationary portion of the binder table is formed by a metal sheeting or plate 190 which overlaps the top flange of the channel member 48, as shown in Figure 4 at 191. The edge 191 thereof forms a continuation of the lower edge of the strip 77, the strip 77 ending at the channel member 48 and overlapping the sheeting 190, as shown in Figure 10. The portion 65 at its front end extends upwardly and forwardly, see Figure 3, forming the front side 193 of the binder table. The plate or portion 65 is extended, as at 65a, to the point 194. The sheeting 190 beyond the point 194 extends forwardly and against the lower edge of the front side 193 overlying the portion 65 of the conveyor housing 46. A slot 196 is cut in the portion or plate 65 for permitting the finger members 79 to enter the housing 46 at the delivery end, see Figure 10. A projection 197 on the sheeting 190 is bent down to meet the section 65.

The sickle 59 is driven by a pitman 200 pivoted on the end of a crank 201. The crank 201 is mounted on the end of a shaft 202 positioned within a housing 205 and has bearing at the lower end in the housing 205 which is supported on the lower side 193 of the binder table. The shaft 202 is driven by means of the sprocket 153, see Figure 1, secured at the upper end thereof, the sprocket 153 being chain connected with the sprocket 139. The sickle 59 is connected with the pitman 200 through a motion transmitting arm 207 which slides in a guide 208 at one end and in a guide 209 at the other end.

The reel 210 is of standard construction, and the drive therefore is taken from the lower end of the sickle drive shaft 202. The reel drive shaft 211 at its lower end enters the top of the housing 205 and is driven from the sickle drive shaft 202 through a set of bevel gears enclosed within the housing 205. At its upper end the reel drive shaft 211 is squared and is slidably but non-rotatably received by a worm and gear mechanism 212, the worm gear of which serves to drive the axle 213 of the reel 210.

The reel 210 is mounted upon a pair of arms 216 and 217, as shown in Figures 1 and 2. The rear end of the arm 216 is pivoted at 218 to a bracket 219 which is supported from the housing 221 which encloses the sickle drive shaft 202. The bracket 219 is braced by means of a brace member 222 secured to the bracket 219 and the housing 221. The arm 217 on the other side of the harvester is pivoted at 224 to a bracket 226 fixed at its rear end to the channel member 45. The rear end of the reel supporting arm 217 is curved downwardly, as shown at 227 in Figure 2, and at the extreme end 228 a cable 229 is fastened and which passes over a pulley 231 at the return end of the conveyor chain housing 46, as best shown in Figures 1 and 8. The cable 229 passes through the housing 46, around a pulley 232 placed in an opening in the housing near the binder table end thereof, around a pulley 233 and connects to the end of a rod 235 connected to a bracket 236 fastened to the front end of the reel supporting arm 216.

The pulley 231 is supported on a bracket 238, which bracket comprises an extension on the end of the casting 89, and best shown in Figures 8 and 9. The extreme end of the sheet metal plate 65 is bent upward at 65b to meet the under side of the bracket 238. The pulley 233 is supported on a diagonal bracket member 240, see Figures 1 and 2, which is fastened to the lower edge of the binder table section 190 and to the tip of the divider 242. The arm 217 is extended so that the angle formed by the pivot 224, points 228, and the pulley 231 will be substantially equal to the angle formed by the pivot 218, bracket 236, and the pulley 233. Thus in controlling the reel for elevation it will be held substantially horizontal for all positions.

The elevation of the reel is controlled through a rod 245 fixed at its upper end to the reel and at its lower end pivoted to a forwardly extending arm on a bell crank 247 which is pivoted to a bracket 248 supported on the housing 221. The upwardly extending arm of the bell crank is pivoted to a pipe 251 having internal threads into which a screw member 252 is threaded. The screw member 252 is controlled through a control rod 254 (Figure 1) extending back to the seat of the tractor. Rotation of the control rod 254 in one direction or the other will serve to rock the bell crank 247 to raise or lower the reel.

The fore and aft position of the reel 210 is controlled by means of a rod 256 which controls a screw 257 which is threaded into a pipe 258 connected to a bell crank 259. The bell crank 259 is connected by means of a link 260 with the reel for moving it fore and aft along the bars 216 and 217 in known manner.

The needle and packing mechanism is of standard construction except that both of the packers 263 and 264 are mounted above and on the upper side of the needle 265, as best shown in Figure 3. The packers and the needle are driven from cranks 267 mounted on an extensible shaft 268 operatively connected to the shaft 177 by means of a universal joint 269.

The binder table and head are shiftable fore and aft in the usual manner, such fore and aft shifting being controlled by screws 269 and 270 connected by means of a shaft 271 and bevel gears 272. The bevel gears and shaft, just mentioned, are controlled by means of a control rod 273 extending back to the operator's position on the tractor, as best shown in Figure 1.

As will be seen from Figure 3 the stalk conveyor canvas operating over the rollers 61 and 62 does not come down in close proximity to the butt conveyor but is spaced a substantial distance therefrom. The portion 68 of the sheet metal plate 64 is of considerable width and extends between the finger members 79 and the lower edge of the stalk conveyor canvas. This construction has particular utility when the harvester is operated in harvesting very short grain and the like.

Where the canvas conveyor is brought down close to the finger members of the butt conveyor there was a tendency when cutting very short grain that the heads of the grain would fall in the direction of travel as it was being conveyed by the butt conveyor and the stalk conveyor, due to the friction of the stalks on the bottom of the butt shelf formed by the sheet metal plate 65. The portion 68 is of such a width that, when cutting short grain, the friction of the heads against this portion 68 substantially counterbalances the friction of the stalks in the bottom of the butt shelf. In this way the stalks, even of very short grain, are maintained in an upright position and are delivered in that position onto the binder table.

The position of the two packers 263 and 264, positioned above the needle 265, is also of particular utility in the harvesting of very short grain. As will be noted from Figure 10, the finger members 79 are so arranged as to be carried a substantial distance within the binder table. This is for the purpose of having the finger members serve, not only as a means for conveying the stalks onto the binder table, but also as a means for pressing or crowding the stalks into the binding and tying mechanism. These finger members cooperate, therefore, with the packers 263 and 264 in binding the grain.

It will be seen that, as shown in Figure 3, when the needle 265 is in its upward position that the conveyor members 79 urge the stalks against the needle from below while the packers 263 and 264 press the grain against the needle from above. Thus, even though the grain is very short, there is little tendency for the grain to become displaced into a transverse position, a common defect found in machines in which the needle was mounted between the packers.

While I have described in connection with the accompanying drawings the specific form in which I prefer to embody my invention, it is to be understood that the invention is not to be limited to the specific means which I have herein shown and described, and that in fact widely different means may be employed in the practice of the broader aspects of my invention.

What I claim and desire to secure by Letters Patent is:

1. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element for movement about an axis thereon, said fingers having guiding means projecting forwardly with respect to said pivot axis on said forward run, means cooperating with said guiding means to maintain the fingers in projected operative position during travel thereof through the upper compartment of the casing, and means to turn the fingers about their pivots at each end of the casing.

2. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, said fingers having guiding means projecting therefrom and adapted to trail on the return run and to extend forwardly on the forward run, means cooperating with said guiding means including a relatively stationary channel receiving the forwardly projecting guiding means at the end of the forward run for turning the fingers about their pivots in a direction opposite to their direction of travel as they approach and pass around the delivery end of the conveyor, and means cooperating with said guiding means to turn the fingers about their pivots to bring them to operative projected position at the other end of the conveyor.

3. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, said fingers having guiding means thereon, means cooperating with said guiding means including a relatively stationary channel for turning the fingers about their pivots in a direction opposite to their direction of travel as they approach and pass around the delivery end of the conveyor, and means cooperating with said guiding means to turn the fingers about their pivots to bring them to operative projected position at the other end of the conveyor, said last named means including an oscillatable cam having a bifurcation adapted to receive the guiding means, said cam being driven in accordance with the speed of the flexible element whereby the guiding means of each finger is adapted to be transferred from said lower compartment to said upper compartment.

4. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, said compartments having guide elements therein and said flexible member having lugs cooperating therewith to maintain the flexible member in position, and means for turning the fingers about their pivots as they approach and pass around the delivery end of the conveyor.

5. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, said fingers having guiding means projecting therefrom, said compartments having guide elements therein and said flexible member having lugs cooperating therewith to maintain the flexible member in position, and means for turning the fingers about their pivots as they approach and pass around the delivery end of the conveyor, including a channel adapted to receive said guiding means and a rotatable member in said channel actuated by said guiding means to permit their passage therethrough and actuated by said flexible element to prevent said guiding means from moving backward through the channel.

6. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, said fingers having guiding means on portions thereof which extend forwardly when the fingers are moved along the upper compartment, said compartments having guide elements therein and said flexible member having lugs cooperating therewith to maintain the flexible member in position, means at the ends of said compartments for receiving said forward guiding means and for turning the fingers about their pivots as they approach and pass around the delivery end of the conveyor, said last mentioned means including a relatively stationary channel adapted to receive said guiding means and means in said channel actuated by said guiding means to permit their passage therethrough and positioned by said fingers to prevent said guiding means from moving backward through the channel, and means at the other end of the conveyor for receiving said guiding means and actuated to turn the fingers about their pivots to bring them to operative projected position at the beginning of the forward run.

7. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element and having guiding means projecting therefrom, said compartments having guide elements therein and said flexible member having lugs cooperating therewith to maintain the flexible member in position, means for turning the fingers about their pivots as they approach and pass around the delivery end of the conveyor, the fingers at the lower run of the conveyor extending in the same general direction as the fingers at the upper end thereof, said last mentioned means including a relatively stationary channel adapted to receive said guiding means and a rotatable member in said channel actuated by said guiding means to permit their passage therethrough and actuated by said flexible element to prevent said guiding means from moving backward through the channel, and means at the other end of the conveyor cooperating with said guiding means to turn the fingers about their pivots to bring them to operative projected position at the beginning of the forward run, said last named means including an oscillatable cam having a bifurcation adapted to receive the guiding means, said cam being driven in accordance with the speed of the flexible element whereby the guiding means of each finger is adapted to be transferred from said lower compartment to said upper compartment.

8. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element, means spacing said fingers from the plane of the flexible element, said fingers having guiding means projecting therefrom, said compartments having guide elements therein and said flexible member having lugs cooperating therewith to maintain the flexible member in position, means for turning the fingers about their pivots as they approach and pass around the delivery end of the conveyor, said last mentioned means including a channel adapted to receive said guiding means and a rotatable member in said channel actuated by said guiding means to permit their passage therethrough and actuated by said spacing means to prevent said guiding means from moving backward through the channel.

9. A conveyor structure for moving stalks and the like, comprising a substantially horizontal casing having an upper compartment and a lower compartment, a conveyor comprising an endless flexible element having a forward run and a return run operating in said upper and lower compartments respectively, spaced supporting means movably carrying said element, a plurality of fingers pivoted to said element, said fingers having guiding means thereon spaced from their pivotal axes, and means cooperating with said guiding means including a channel beyond the supporting means for receiving said guiding means to turn the fingers about their pivots as they approach and pass around the delivery end of the conveyor, whereby said fingers are withdrawn from the stalks.

10. A conveyor structure for moving stalks and the like comprising a substantially horizontal casing having an upper compartment and a lower compartment, a conveyor comprising an endless flexible element having a forward run and a return run operating in said upper and lower compartments respectively, spaced supporting means movably carrying said element, a plurality of fingers pivoted to said element, said fingers having guiding means thereon spaced from their pivotal axes, and means cooperating with said guiding means including a channel beyond the supporting means for receiving said guiding means to turn the fingers about their pivots as they approach and pass around the delivery end of the conveyor, whereby said fingers are withdrawn from the stalks, said channel being so shaped that said fingers are withdrawn from the stalks substantially along the axis of the finger.

11. A conveyor structure for harvesting machines, comprising a casing having an upper compartment and a lower compartment, a conveyor comprising an endless flexible element having a forward run and a return run operating in said upper and lower compartments respectively, a plurality of fingers pivoted to said element and having guide means projecting therefrom, means for turning the fingers about their pivots as they approach and pass around the delivery end of the conveyor, and means at the other end of the conveyor cooperating with said guiding means to turn the fingers about their pivots to bring them to operative projected position at the beginning of the forward run, said last named means including an oscillatable cam adapted to receive the guiding means whereby each finger is adapted to be transferred from said lower compartment to said upper compartment.

12. In an agricultural implement, a conveyor structure for moving stalks and the like comprising an endless flexible element having a forward run and a return run, spaced sprockets supporting said element, a plurality of tines pivoted in spaced apart relationship to said flexible element and each having guiding means thereon spaced from the axis of its pivotal connection, and means for reversing each of said tines at the ends of said runs relative to the flexible element so that the tines are returned in generally the same position they occupy on the forward run, said means including a curved channel beyond the sprockets to successively receive the guiding means and corresponding generally to the curvature of the adjacent sprocket so that as the tines pass around the sprocket they are shifted substantially linearly along their axes.

13. In an agricultural machine, a conveyor structure for moving stalks and the like comprising a casing, an endless flexible element having a forward run and a return run, sprockets journaled in said casing and supporting said flexible element, a plurality of fingers pivoted eccentrically to said element in spaced apart relationship, said fingers projecting outwardly from the casing during the forward run and having guiding means projecting forwardly in the direction of movement of the fingers during said forward run, and means for turning the fingers about their pivots as they approach and pass around the delivery end of the conveyor, said means comprising a curved channel beyond the sprocket at the delivery end adapted to receive said guiding means to guide the fingers as they are withdrawn within the casing during the movement of the flexible element around said last named sprocket, said channel being curved to correspond generally to the curvature of the sprocket.

14. In an agricultural machine, a conveyor structure for moving stalks and the like comprising a casing, an endless flexible element operating in the casing and having a forward run and a return run, a plurality of stalk moving fingers pivoted to said element, guiding means on each of said fingers and spaced forwardly of the pivotal connection of said finger with said element with respect to the direction of movement of the finger on one of said runs, spaced apart sprockets journaled in said casing and adapted to support said flexible element, and channel means in said casing beyond said sprockets for receiving said guiding means and operative to reverse said fingers successively with respect to the flexible element as the latter moves around the adjacent sprocket.

15. In an agricultural machine, a conveyor structure for moving stalks and the like comprising a casing, an endless flexible element operating in the casing and having a forward run and a return run, a plurality of stalk moving fingers pivoted to said element, guiding means on each of said fingers and spaced forwardly of the pivotal connection of said finger with said element with respect to the direction of movement of the finger on one of said runs, spaced apart sprockets journaled in said casing and adapted to support said flexible element, channel means in said casing beyond said sprockets for receiving said guiding means and operative to reverse said fingers successively with respect to the flexible element as the latter moves around the adjacent sprocket, and a latch in said channel means to prevent backward movement of the guiding means therein.

16. In an agricultural machine, a conveyor structure comprising a casing, an endless flexible element having a forward run and a return run, sprockets journaled in said casing and supporting said flexible element, a plurality of fingers each of generally triangular configuration having a base portion adapted to lie along said flexible element and stalk moving means at the apex, means pivotally connecting one end of the base portion of each of the fingers to said element, guiding means on the other end of the base portion of each of said fingers and means adjacent said sprockets and cooperating with said guiding means for reversing the fingers relative to the flexible element as the latter passes around the sprockets.

17. In an agricultural machine, a conveyor structure comprising a casing, an endless flexible element having a forward run and a return run, sprockets journaled in said casing and supporting said flexible element, a plurality of fingers each of generally triangular configuration having a base portion adapted to lie along said flexible element and stalk moving means at the apex, means pivotally connecting one end of the base portion of each of the fingers to said element, guiding means on the other end of the base portion of each of said fingers, and a channel near one end of the casing arranged to receive said guide means for the purpose of reversing the fingers as they pass around the adjacent sprocket.

18. In an agricultural machine, a conveyor structure comprising a casing, an endless flexible element having a forward run and a return run, sprockets journaled in said casing and supporting said flexible element, a plurality of fingers each of generally triangular configuration having a base portion adapted to lie along said flexible element and stalk moving means at the apex, means pivotally connecting one end of the base portion of each of the fingers to said element, guiding means on the other end of the base portion of each of said fingers, and means including an oscillatable cam adjacent one of the sprockets for receiving the guiding means on each of the fingers to successively reverse the fingers relative to the flexible element as they pass around the sprocket.

19. In an agricultural machine, a conveyor structure comprising a casing, an endless flexible element having a forward run and a return run, sprockets journaled in said casing and supporting said flexible element, a plurality of fingers each of generally triangular configuration having a base portion adapted to lie along said flexible element and stalk moving means at the apex, means pivotally connecting one end of the base portion of each of the fingers to said element, guiding means on the other end of the base portion of each of said fingers, and means including a channel at one end of the casing and an oscillatable cam at the other end of the casing for successively receiving the guiding means on the fingers to reverse the latter relative to the flexible element as they pass around the sprockets.

20. In an agricultural machine, a conveyor structure for moving stalks and the like comprising, in combination, a casing having a longitudinal slot, an endless flexible element situated within said casing, a pair of spaced apart rotatable members supporting said flexible element, a plurality of stalk moving fingers pivoted eccentrically to said flexible element in spaced apart relationship, and means including an oscillatable cam driven from one of said sprockets for reversing the fingers as they successively pass around said sprocket.

21. In an agricultural implement, a conveyor structure comprising a casing, an endless flexible element having a forward run and a return run operating in said casing, a pair of sprockets supporting said flexible element in the casing, a plurality of fingers pivoted to said element in successively spaced apart relationship, each of said fingers having a tine portion angled forwardly with respect to its direction of movement during said forward run, and means adjacent one end of the casing arranged to impart a slight backward angular displacement to each finger as it is withdrawn within the casing at the end of said forward run.

22. In an agricultural implement, a conveyor structure comprising a slotted casing, an endless flexible element having a forward run and a return run operating in said casing, rotatable supporting means for said element journaled in said casing, a plurality of fingers pivoted to said element and having tine portions adapted to be projected through the slot in the casing, guiding means on each of said fingers spaced from the point of pivotal connection with the flexible element, channel means adjacent one end of the casing and beyond the supporting means for the flexible element adapted to receive the guiding means on the fingers to reverse the latter relative to the flexible element as the element passes around the supporting means, and means associated with said channel for imparting a slight backward angular displacement to the fingers as they are reversed relative to the flexible element.

In witness whereof I hereunto subscribe my name this 6th day of November, 1929.

EDGAR E. METCALF.